United States Patent [19]
Aston

[11] 3,847,018
[45] Nov. 12, 1974

[54] APPARATUS FOR TESTING THE DEFORMATION UNDER LOAD OF RUBBER OR OTHER ELASTICALLY DEFORMABLE MATERIALS

[75] Inventor: Michael William Aston, Solihull, England

[73] Assignee: Joseph Lucas (Industries) Limited, Birmingham, England

[22] Filed: July 10, 1973

[21] Appl. No.: 377,916

[52] U.S. Cl. ..................................... 73/94, 73/49.8
[51] Int. Cl. ........................................... G01n 3/08
[58] Field of Search ...................... 73/94, 103, 49.8

[56] References Cited
UNITED STATES PATENTS

| 2,004,660 | 6/1935 | Hounsfield | 73/95 |
| 3,550,441 | 12/1970 | Dickinson | 73/94 |

FOREIGN PATENTS OR APPLICATIONS

| 146,481 | 8/1962 | U.S.S.R. | 73/49.8 |
| 171,647 | 11/1965 | U.S.S.R. | 73/103 |

Primary Examiner—Jerry W. Myracle
Attorney, Agent, or Firm—Holman & Stern

[57] ABSTRACT

An apparatus for testing the deformation under load of elastic materials has a base and a pressure plate between which a specimen may be clamped. An initial deformation is applied to the specimen by a screw which coacts with the pressure plate. The screw also provides one of a pair of electrical contacts, the other contact moving with the pressure plate. An external load applied to the pressure plate to further deform the specimen breaks an electrical circuit to provide a reading of this further load. Provision is made for releasing the load applied by the screw and for resetting the screw so as to apply the same initial load.

9 Claims, 3 Drawing Figures

PATENTED NOV 12 1974

3,847,018

APPARATUS FOR TESTING THE DEFORMATION UNDER LOAD OF RUBBER OR OTHER ELASTICALLY DEFORMABLE MATERIALS

This invention relates to an apparatus for testing the deformation under load of rubber, or other elastically deformable materials.

An apparatus for this purpose is shown and described in our U.S. Pat. No. 3,550,441, and shows a threaded element which can be adjusted so as to apply, via a pressure plate, an initial load to an elastically deformable member. The threaded element also acts as one of a pair of electrical contacts, the other of the contacts being arranged to move with the pressure plate. An external load is applied to the pressure plate to further compress the deformable member. Further compression of the deformable member allows the pressure plate and its associated contact to move away from the threaded element, and thereby to break an electrical circuit.

This break in the circuit can be used to initiate a recording of the external load, and thus to provide an indication of the load applied by the threaded element. The apparatus may be used to provide an indication of the load required to cause a given deformation of the member under test. Alternatively, if the member under test is maintained for a known time under load from the threaded element, the external load required to cause subsequent further deformation will provide an indication of the non-elastic deformation of the test member.

In an apparatus of the foregoing kind it is required that it shall be possible to release the load applied by the threaded element, and subsequently to reset the latter to reapply the same load.

It is an object of the present invention to provide an apparatus in which an initial load may readily be reset.

Embodiments of the invention will now be described by way of example with reference to the accompanying drawings in which.

Figure 1:
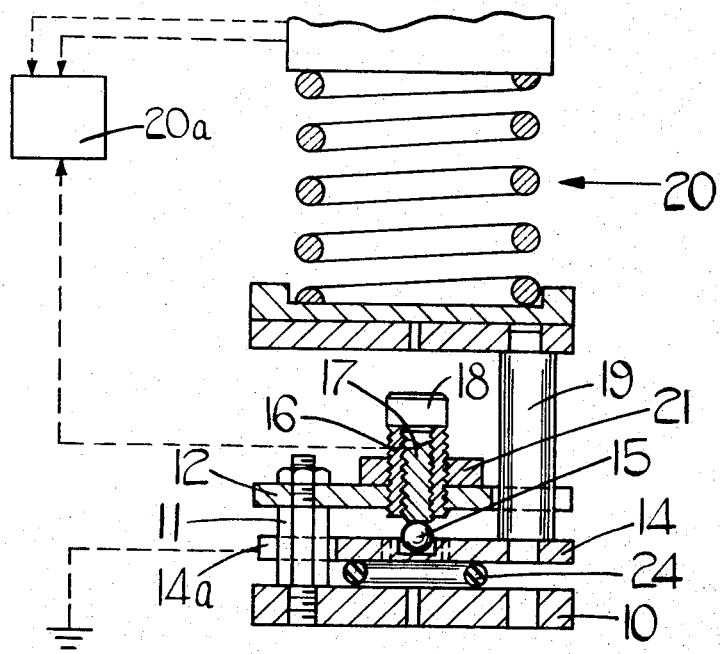
FIG. 1 is a sectional side view of the apparatus.

The apparatus shown in FIG. 1 is essentially that shown and described in the patent specification referred to above, and includes a base 10, a clamping plate 12 held in spaced relation to the base 10 by posts 11, a pressure plate 14 having recesses 14a through which the posts 11 pass, and posts 19 connected to plate 14 so as to transmit thereto a force applied by a loading arrangement, shown generally at 20. A ball 15 is engaged in a recess at the centre of plate 14.

Threadedly engaged with the centre of plate 12 is a bush 16 within which a set screw 17 is in turn threadedly engaged. Screw 17 includes a tungsten carbide tip which engages the ball 15. Ball 15 is also preferably formed of tungsten carbide. Screw 17 has a shouldered head 18 which is engageable with an end of the bush 16.

The apparatus is used, as described in the aforementioned application, to test, for example, an elastomeric sealing ring 24, screw 17 and ball 15 being connected electrically so as to provide switch contacts for a circuit. A load is applied by screw 17 via a ball 15 and plate 14 to the ring 24. If this load is applied by first bringing the head 18 of screw 17 into abutment with the end of bush 16 and then turning the screw 17 and bush 16 together, the load may subsequently be released and re-applied to the same value by moving screw 17 only. Locking means 21 are associated with bush 16 to maintain it in position with respect to plate 12 once the desired load has been applied. The magnitude of the load is measured, as described in the aforementioned patent specification by measuring the load applied by an arrangement 20 which includes a load measuring device 20a, which will cause contact between ball 15 and screw 17 to be broken. Device 20a is responsive to interruption of the circuit which includes ball 15 and screw 17.

If the specimen to be tested is electrically conductive, as for example a metal lock washer or a metal seal, the base 10 or the plate 14, or both, may be formed of non-conducting material, as for example a ceramic. Alternatively one or both may be coated with a non-conducting material on the areas against which the specimen under test bears. This coating may, as shown in FIG. 2, be in the form of an insert 25, 26 in the respective parts 10, 14.

Figure 2:
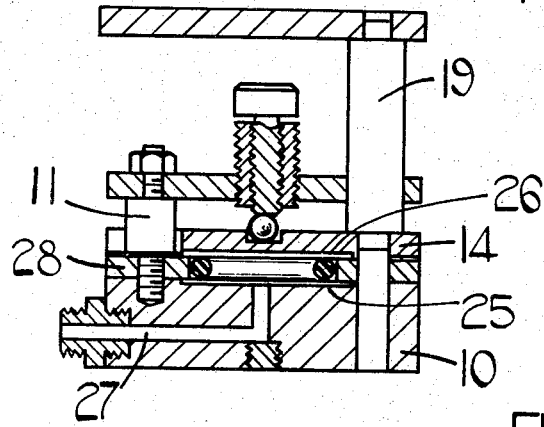
FIG. 2 is a part section of a modified form of the apparatus of FIG. 1.

FIG. 2 also shows a modification to the base 10 which may include a passage 27 by means of which a fluid under pressure may be admitted to an annular test specimen. Secured to the base 10 by the pillars 11 is a ring 28 which defines a recess within which the specimen is located, the inner wall of this recess serving also to support the specimen when the latter is subjected to an internal fluid pressure. The axial dimension of the ring 28 is less than the minimum compressed length of the specimen.

Figure 3:
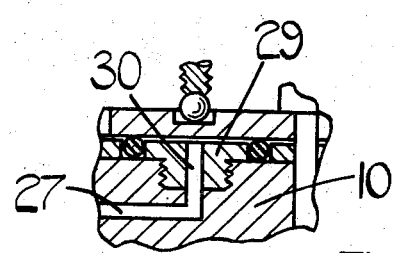
FIG. 3 is a part section of a further modification to the apparatus of FIG. 2.

FIG. 3 shows a modification to the base shown in FIG. 2. A plug 29 is secured centrally to the base 10 within the ring 28 so as to define an annular recess within which the specimen is located. It will be understood that the axial dimension of the plug 29 above the surface of the base 10 is less than the axial dimension of the ring 28. A passage 30 within plug 29 communicates with the passage 27, whereby a fluid under pressure may be admitted to the annular recess internally of the specimen. It will be understood that if either or both of the parts 10, 14 include non-conductive material as previously described the plug 29 will also be formed of a non-conducting material or include a non-conductive area where the specimen comes into contact with plug 29.

I claim:

1. Apparatus for testing the deformation under load of rubber or other elastically deformable materials, comprising, in combination, a base for supporting the specimen, a pressure plate arranged to bear against the specimen supported on the base, an electrically conductive contact piece upstanding from the centre of the pressure plate, a clamping plate connected to the base, screw means whereby a load is, in use, applied from the clamping plate through the contact piece and pressure plate to a specimen on the base, load applying means arranged to bear on the pressure plate, and load measuring apparatus connected to said load applying means, the said screw means comprising a bush which is axially adjustable with respect to said clamping plate and a plug threadedly engaged within the bush, the said plug having an abutment which is engageable with the sleeve to locate the plug axially with respect to the bush, the arrangement being such that when the load applied by said load applying means exceeds the load applied from the clamping plate, the contact piece will be removed from contact with the clamping plate to break an electric connection therewith.

2. An apparatus as claimed in claim 1 in which the bush is threadedly engaged with the clamping plate and which includes locking means to secure the bush in a predetermined axial position with respect to the clamping plate.

3. An apparatus as claimed in claim 1 which includes, between the base and the pressure plate, means for supporting and locating the periphery of the specimen.

4. An apparatus as claimed in claim 1 which includes, between the base and the pressure plate, a plug which lies, in use, within a bore in the specimen to locate the latter.

5. An apparatus as claimed in claim 4 in which the said plug includes a passage which communicates with a passage within the base.

6. An apparatus as claimed in claim 1 in which at least that portion of the base against which the specimen, in use, bears being formed of an electrically insulating material.

7. An apparatus as claimed in claim 6 in which the said insulating portion comprises a coating.

8. An apparatus as claimed in claim 7 in which the coating is in the form of an insert in the base.

9. An apparatus as claimed in claim 1 in which at least that portion of the pressure plate against which the specimen, in use, bears being formed of an electrically insulating material.

* * * * *